(12) United States Patent
Graziano et al.

(10) Patent No.: US 10,951,418 B1
(45) Date of Patent: Mar. 16, 2021

(54) MANAGING ENROLLMENT OF DIGITAL IDENTITIES FOR SECURE AIR-TO-GROUND COMMUNICATION SESSIONS

(71) Applicant: Rockwell Collins, Inc., Cedar Rapids, IA (US)

(72) Inventors: Charles David Graziano, Marion, IA (US); Patrick J. Morrissey, Marion, IA (US); Benjamin David Mossman, Walford, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 250 days.

(21) Appl. No.: 15/897,736

(22) Filed: Feb. 15, 2018

(51) Int. Cl.
*H04L 9/32* (2006.01)
*H04L 29/06* (2006.01)

(52) U.S. Cl.
CPC ............ *H04L 9/3249* (2013.01); *H04L 9/321* (2013.01); *H04L 63/0442* (2013.01); *H04L 63/0823* (2013.01); *H04L 9/3239* (2013.01)

(58) Field of Classification Search
CPC . H04L 63/0823; H04L 9/3268; H04L 9/3263; H04W 12/0609
See application file for complete search history.

(56) References Cited

U.S. PATENT DOCUMENTS

| | | | | |
|---|---|---|---|---|
| 2014/0235203 A1* | 8/2014 | Gonsalves | ............ | H04W 12/06 455/410 |
| 2015/0133116 A1* | 5/2015 | Lauer | ...................... | H04W 8/10 455/435.1 |
| 2015/0133117 A1* | 5/2015 | Lauer | ..................... | H04W 12/04 455/435.1 |
| 2016/0274578 A1* | 9/2016 | Arwine | ............. | H04W 12/0609 |
| 2018/0013723 A1* | 1/2018 | Kirk | ..................... | H04W 12/001 |
| 2018/0167812 A1* | 6/2018 | Nagarajamoorthy | ........................ | H04W 4/021 |

OTHER PUBLICATIONS

Pritikin et al., "Enrollment over Secure Transport", Internet Engineering Task Force, https://tools.ietf.org/html/rfc7030, Oct. 2013. 54 pages.

* cited by examiner

*Primary Examiner* — Lynn D Feild
*Assistant Examiner* — Richard A McCoy
(74) *Attorney, Agent, or Firm* — Suiter Swantz pc llo

(57) ABSTRACT

Systems and methods of managing enrollment of digital identities (e.g., for aeronautical communication) can involve a line-replaceable unit (LRU) in an aircraft establishing a digital identity with a ground-based server by requesting a public certificate from the ground-based server. The LRU may receive a public certificate from the ground-based server. The LRU may validate the public certificate. The LRU may generate, based on validating the public certificate, an enrollment status message indicative of at least one status code from a plurality of predefined status codes associated with a plurality of corresponding actions for the ground-based server. The LRU may transmit the enrollment status message including the at least one status code to the ground-based server, to cause the ground-based server to perform a corresponding action based on the at least one status code.

20 Claims, 5 Drawing Sheets

MANAGING ENROLLMENT OF DIGITAL IDENTITIES FOR SECURE AIR-TO-GROUND COMMUNICATION SESSIONS

BACKGROUND

To establish a digital identity in aeronautical environments, an airborne unit may transmit a request for a digital certificate to ground-based infrastructure. The ground-based infrastructure may retrieve the digital certificate from a certificate authority. Once retrieved, the digital certificate may be sent by the ground-based infrastructure to the airborne unit. After the digital certificate is sent, under currently existing frameworks there may be no way for either the airborne unit or the ground-based infrastructure to indicate whether the digital identity is in fact established. This may be highly problematic in aeronautical environments in which there may be frequent interruptions in connectivity.

SUMMARY

In one aspect, embodiments of the inventive concepts disclosed herein are directed to a method of managing certificates. At least one processor of a line-replaceable unit (LRU) in an aircraft having one or more or processors may establish a digital identity through a ground-based server by requesting a public certificate from the ground-based server via the at least one processor. The LRU may receive a public certificate from the ground-based server. The LRU may validate the public certificate. The LRU may generate, based on validating the public certificate, an enrollment status message indicative of at least one status code from a plurality of predefined status codes associated with a plurality of corresponding actions for the ground-based server. The LRU may transmit the enrollment status message indicative of the at least one status code to the ground-based server, to cause the ground-based server to perform a corresponding action based on the at least one status code.

In some embodiments, the LRU may establish the digital identity with the ground-based server. In some embodiments, the LRU may re-validate the public certificate subsequent to a time period after establishing the digital identity. In some embodiments, the LRU may generate, based on re-validating the public certificate, a certificate status message indicative of an updated status code comprising one of the at least one status code or a second status code from the plurality of predefined status codes. In some embodiments, the LRU may transmit the certificate status message including the updated status code to the ground-based server, to cause the ground-based server to perform a second corresponding action based on the updated status code.

In some embodiments, transmitting the certificate status message may include transmitting the certificate status message at intervals until one of a next re-validation of the public certificate occurs or upon receipt of a response from the ground-based server. In some embodiments, generating the enrollment status message may include selecting the at least one status code indicating that the public certificate is valid or that the validation is successful. In some embodiments, transmitting the enrollment status message may include transmitting the enrollment status message to cause the ground-based server to delete a copy of the public certificate.

In some embodiments, generating the enrollment status message may include selecting the at least one status code indicating that the public certificate is valid or that the validation is successful. In some embodiments, transmitting the enrollment status message may include transmitting the enrollment status message to indicate to the ground-based server that the digital identity of the LRU has been established. In some embodiments, generating the enrollment status message may include selecting the at least one status code indicating that the public certificate is valid or that the validation is successful. In some embodiments, transmitting the enrollment status message may include transmitting the enrollment status message to cause the ground-based server to delete any previous request and associated certificate in preparation for a new certificate request. In some embodiments, generating the enrollment status message may include selecting the at least one status code indicating that the public certificate is unable to be stored after one or more failed attempts to receive or verify the public certificate. In some embodiments, transmitting the enrollment status message may include transmitting the enrollment status message to cause the ground-based server to delete any previous request and associated certificate in preparation for a new certificate request.

In some embodiments, validating the public certificate may include at least one of: determining whether the public certificate is valid via a certificate revocation list or an online certificate status protocol (OCSP) server; determining whether the public certificate is signed by a trusted certificate authority; determining whether the public certificate is valid against a defined trusted certification chain on the LRU; determining whether the public certificate is successfully stored by the LRU in the aircraft; determining whether the public certificate has expired; determining whether the public certificate matches a certificate signing request (CSR) sent by the LRU to request the public certificate from the ground-based server; determining whether the private key corresponding to the public certificate is damaged or lost; or determining whether the public certificate is damaged or lost.

In a further aspect, embodiments of the inventive concepts disclosed herein are directed to a line-replaceable unit (LRU) in an aircraft. The LRU may include a session manager executable on at least one processor. The session manager may transmit a request for a public certificate to a ground-based server to initiate a digital identity. The LRU may include a certificate validator executable on the at least one processor. The certificate validator may validate the public certificate from the ground-based server. The certificate validator may generate an enrollment status message including a status code to transmit to the ground-based server for performing an action based on the validation of the public certificate.

In some embodiments, the certificate validator may re-validate the public certificate subsequent to a time period after the transmission of the enrollment status message. In some embodiments, the certificate validator may generate a certificate status message indicative of an updated status code to transmit to the ground-based server to perform a corresponding action based on the re-validation of the public certificate.

In some embodiments, the certificate validator may generate a check-in message to transmit to the ground-based server based on the public certificate to cause the ground-based server to perform an identity status check using the check-in message. In some embodiments, the certificate validator may receive a status response indicating a result of the identity status check from the ground-based server.

In some embodiments, the certificate validator may establish a secure communication with the ground-based server prior to transmission of the enrollment status message to the ground-based server. In some embodiments, the system may include a communication interface to communicate information including flight operations or maintenance data of the aircraft to the ground-based server.

In a further aspect embodiments of the inventive concepts disclosed herein are directed to a ground-based server for communicating with airborne units. The ground-based server may include a communication interface executable on at least one processor. The communication interface may receive a request to establish a digital identity from a line-replaceable unit (LRU) of an aircraft. The ground-based server may include an enrollment engine executable on the at least one processor. The enrollment engine may transmit a public certificate from a certificate authority responsive to the request from the LRU. The enrollment engine may perform an action. The action may be performance in accordance with a status code of an enrollment status message received from the LRU subsequent to the transmission of the public certificate. The status code may indicate a result of a validation of the public certificate by the LRU.

In some embodiments, the enrollment engine may determine that a certificate status message is not received from the LRU within a predefined time period subsequent to the receipt of the enrollment status message. In some embodiments, the enrollment engine may retransmit the public certificate to LRU, responsive to the determination that the certificate status message is not received.

In some embodiments, the enrollment engine may receive a check-in message generated based on the public certificate from the LRU. In some embodiments, the enrollment engine may perform an identity status check for the LRU using the check-in message. In some embodiments, the enrollment engine may transmit a status response indicating a result of the identity status check to the LRU.

In some embodiments, the enrollment engine may determine, based on the status code of the enrollment status message, that the public certificate is valid or that the validation of the public certificate is successful. In some embodiments, the enrollment engine may delete a locally stored copy of the public certificate, responsive to the determination that the public certificate is valid or that the validation of the public certificate is successful.

In some embodiments, the enrollment engine may determine, based on the status code of the enrollment status message, that the public certificate is invalid or that the validation of the public certificate is unsuccessful. In some embodiments, the enrollment engine may identify a cause of failure in the validation of the public certificate corresponding to the status code of the enrollment status message, responsive to the determination that the public certificate is invalid or that the validation of the public certificate is unsuccessful. In some embodiments, the enrollment engine may perform the action in accordance to the identified cause of failure of the validation of the public certificate corresponding to the status code of the enrollment status message.

In some embodiments, the enrollment engine may receive, subsequent to a time period after establishing the digital identity, a certificate status message including an updated status code from the LRU. The updated status code may include one of the status code or a second status code. In some embodiments, the enrollment engine may perform a second action in accordance with the updated status code of the certificate status message received from the LRU.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
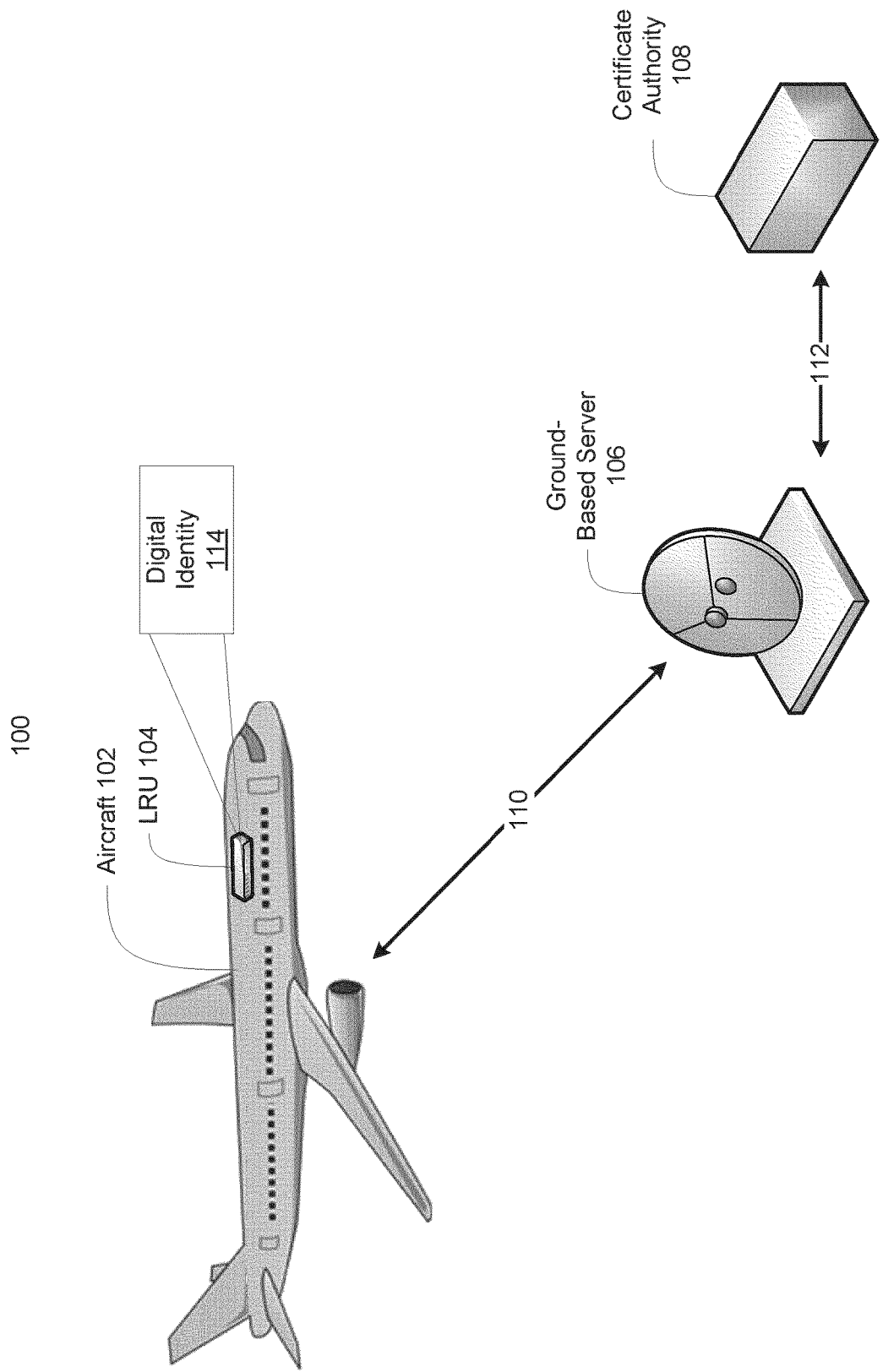
FIG. 1 is a block diagram of an environment for managing enrollment of digital identities, in accordance with some embodiments of the inventive concepts disclosed herein.

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the schematic diagrams, but should be construed in accordance with the language in the claims.

In some aspects, embodiments of the inventive concepts disclosed herein are directed to a system, a method, or an apparatus for managing digital identities, for air-to-ground communication for instance. To initiate a digital identity between an airborne unit and ground-based infrastructure, the airborne unit may generate a private key and a public key and transmit a certificate signing request with the public key. The ground-based infrastructure may forward the request to a certificate authority. The certificate authority may generate a digital certificate (also referred to as a public certificate or an identity certificate) assigning a subject (also referred to as an owner) the public key to the airborne unit. The certificate authority may send the digital certificate to the ground-based infrastructure. The ground-based infrastructure may transmit the digital certificate to the airborne unit. At this point, currently existing techniques may assume the digital identity has been established between the airborne unit and the ground-based infrastructure upon the sending of the digital certificate, without performing any additional verification.

To ensure that the digital identity is in fact established between the airborne unit and the ground-based infrastructure, the airborne unit may generate and send back an enrollment status message with the results of the validation of the digital certificate. The airborne unit may validate the digital certificate by checking the digital certificate against the private key or the public key generated at the outset of the initiating the digital identity. The message may indicate whether the validation of the digital certificate was successful or unsuccessful. If the validation was unsuccessful, the message may further indicate a cause of the failure in the validation of the public certificate. Using the enrollment status message, the ground-based infrastructure may verify whether the public certificate was successfully validated by the airborne unit. When the message indicates that the validation was unsuccessful, the ground-based infrastructure may perform measures in response in order to guarantee the establishment of the digital identity.

Referring to FIG. 1, depicted is one embodiment of an environment 100 for managing enrollment of digital identities, e.g., for air-to-ground communication. The environment 100 may include an aircraft 102, a ground-based server 106, and a certificate authority 108. The aircraft 102 may be any type of aircraft (e.g., a helicopter, propeller airplane, passenger airliner, fighter plane, or dirigible balloon) with one or more line-replaceable units (LRUs) 104. Each LRU 104 (also referred to as a lower line-replaceable unit (LLRU), a line-replaceable item (LRI), or a line-replaceable component (LRC)) may be a modular component housed in the aircraft 102, such as in an electronics/engineering (E/E) bay area or in a location in the cabin, bulkhead, bag bin region, or an avionics rack. Each LRU 104 may be connected to other electrical components on the aircraft 102 (e.g., a data interface bus). Each LRU 104 may be quickly removed and replaced or interchanged from the aircraft 102 (e.g., via quick release fittings such as a screw or plug) at a field level to allow fast restoring of services provided by the LRU 104. Each LRU 104 may contain or include one or more processors and memory with instructions for processing data on flight operations, maintenance, and diagnostics received from other avionics hardware units of the aircraft 102. The ground-based server 106 may refer to any computing device stationed on the ground or waters that can be in communication with airborne units such as the LRU 104 and other ground-based computing devices.

The LRU 104 may also transmit the data on flight operations, maintenance, and the diagnostics of the aircraft 102 with ground-based infrastructure, such as the ground-based server 106. To communicate the data, the LRU 104 may establish a secure communication session 110 with the ground-based server 106, using a digital identity 114 of the LRU 104. The digital identity 114 may include information used to uniquely identify an entity by a computing device (e.g., the LRU 104) to represent to another entity. The entity may be a person, an organization, an application, an aircraft (e.g., the aircraft 102), a device (e.g., the LRU 104), or another computing device, among others. The digital identity may be represented by the private key, the public key, and/or the public certificate, among others. For example, the digital identity can be represented by a private key and an associated public certificate, and can include attribute(s) related to the entity. The digital identity or the public certificate can also include the public key cryptographically associated with the private key. The establishment of the digital identity may be in accordance with any communication protocol based on a public key infrastructure (PKI). Establishing a digital identity can be described as the process through which a LRU creates its private key and certificate signing request (e.g., a CSR including a corresponding public key), sends the CSR to the ground server system, and retrieves Certificate Authority signed public certificate for storage.

In accordance with a communication protocol based on a PKI, the LRU 104 may generate a private key and a public key for encrypting and decrypting messages to be exchanged via the secure communication session 110. The LRU 104 may also generate a certificate signing request (CSR) containing an identifier for the LRU 104 (e.g., a distinguished name, a geographic address, unique name) and the public key to be assigned to the LRU 104. Once generated, the LRU 104 may transmit the request to the ground-based server 106.

The ground-based server 106 may receive the certificate signing request for establishing the digital identity 114 from the LRU 104. The ground-based server 106 may be in communication 112 with the certificate authority 108, and forward the request from the LRU 104 to the certificate authority 108. Using the request, the certificate authority 108 may generate and issue a public certificate assigning the public key to the identifier for the LRU 104. The public certificate may also include a digital signature generated by the certificate authority 108 by encrypting the public key and an identifier for the certificate authority 108. The certificate authority 108 may send the issued public certificate to the ground-based server 106. The ground-based server 106 may forward the public certificate to the LRU 104.

The LRU 104 may validate the public certificate to ensure the establishment of the digital identity 114 with the ground-based server 106. The LRU 104 may store the public certificate as part of the digital identity 114. To validate, the LRU 104 may check the digital signature of the public certificate against the generated private key. In some embodiments, the LRU 104 may compare a modulus of a portion of digital certificate with a modulus of the private key. If the two match, the LRU 104 may determine that the validation is successful and may store the public certificate, thereby completing the establishment of the digital identity 114. On the other hand, if the two do not match, the LRU 104 may determine that the validation is unsuccessful.

As previously discussed, currently existing approaches may assume that the digital identity 114 and/or the secure communication session 110 has been established once the public certificate is sent to the LRU 104 without any additional verification. Such an assumption, however, may not be always valid, especially in aeronautical settings such as the environment 100 where interruptions in connections may be frequent. Further, the supposition may make the digital identity 114 and/or the secure communication session 110 vulnerable to security breaches from unauthorized entities or units. A malicious third-party entity or another line-replaceable unit may also attempt to acknowledge and use the public certificate as belonging to the entity or other unit besides the LRU 104 that originally sent the request.

To guarantee the establishment of the digital identity 114 the LRU 104 may generate an enrollment status message to notify the ground-based server 106 whether the validation of the public certificate was successful. The enrollment status message may also include a cause of failure using a status code, if the validation of the public certificate at LRU 104 is unsuccessful. The ground-based server 106 may parse and process the enrollment status message to determine whether the validation of the public certificate was successful at the LRU 104. The ground-based server 106 may perform an action or measure in response to the determination of whether the validation was successful. If the validation is determined to be successful, the ground-based server 106 may determine that the digital identity 114 is successfully established and may commence exchanging messages using the digital identity 114. If the validation is determined to be unsuccessful, the ground-based server 106 may identify the cause of failure from the enrollment status message. Based on the identified cause of failure, the ground-based server 106 may perform one or more measures to ensure that the digital identity 114 becomes established between the LRU 104 and the ground-based server 106. The one or more measures may include resending the issued public certificate to the LRU 104, requesting the certificate authority 108 to reissue another public certificate, or requesting the LRU 104 to generate another certificate signing request, among others.

Since the private key used to validate the public certificate is not sent to any other unit, any chance that the public certificate is acknowledged by another unit besides the LRU 104 that generated the original certificate signing request may be eliminated. Furthermore, both the LRU 104 and the ground-based server 106 may take proactive actions to ensure the establishment of the digital identity 114.

Figure 2:
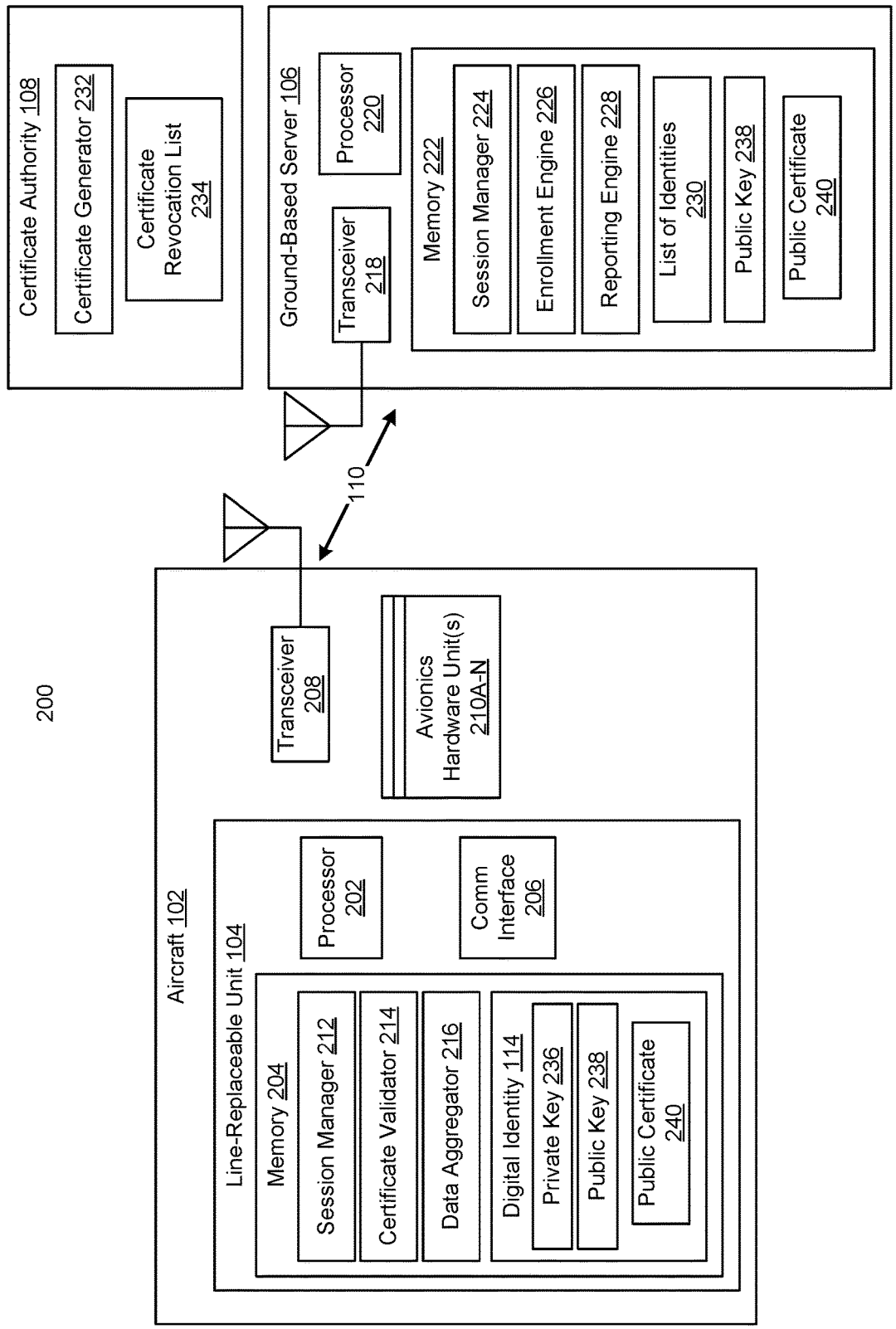
FIG. 2 shows a block diagram of a system architecture for managing enrollment of digital identities, in accordance with some embodiments of the inventive concepts disclosed herein.

Referring to FIG. 2, shown is an example system block diagram of a system 200 for managing enrollment of digital identities, for air-to-ground communication sessions for instance. The system 200 may include the aircraft 102, the LRU 104, the ground-based server 106, and the certificate authority 108 as described above in connection with FIG. 1. In overview, the aircraft 102 includes the LRU 104, a transceiver 208, and one or more avionics hardware units 210A-N (hereinafter generally referred to as avionics hardware unit 210). The components in the aircraft 102 may be connected or otherwise communicatively coupled to one another. The LRU 104 includes at least one processor 202, a memory 204, and a communication interface 206. The memory 204 includes instructions executable by the processor 202, such as a session manager 212, a certificate validator 214, and a data aggregator 216, among others. The ground-based server 106 includes at least one processor 220, a memory 222, and a transceiver 218. The memory 222 of the ground-based server 106 includes instructions executable by the processor 220, such as a session manager 224, an enrollment engine 226, and a reporting engine 228, among others. The certificate authority 108 includes at least one processor and memory including instructions executable by the processor, such as a certificate generator 232 and a certificate revocation list 234, among others.

In the LRU 102, the session manager 212 may initiate establishing of the digital identity 114 with the ground-based server 106 via the transceiver 208. The digital identity 114 may be represented by or may include a private key 236, a public key 238, a public certificate 240, an identifier for the LRU 104, and/or attributes of the LRU 104, among others. In some embodiments, the session manager 212 may initiate a secure communication session 110, as part of or in addition to establishing the digital identity. The establishment of the digital identity 114 and/or the secure communication session 110 may be in accordance with any public key infrastructure (PKI) based communication protocol. The abstraction layer for the secure communication session 110 and/or the digital identity 114 may be the application layer or the transport layer in the Open Systems Interconnect (OSI) model. The communication protocol used to establish the digital identity 114 and/or the secure communication session 110 may be the Hypertext Transfer Protocol (HTTP), the Transport Layer Security (TLS), the Datagram Transport Layer Security (DTLS), or the User Datagram Protocol (UDP), or other application layer and transport layer protocols, among others. In some embodiments, the communication protocol used to establish the secure communication session 110 or digital identity 114 may be the Enrollment over Secure Transport (EST) protocol. Under the EST protocol, the public key generated by clients (e.g., the LRU 104) may be passed through a server (e.g., the ground-based server 106) and signed by a certificate authority (e.g., the certificate authority 108) creating a public certificate. The certificate authority may return the public certificate to the server and the server may send the public certificate to the client that made the request. Subsequent messages between the client and the server may be encoded and decoded using the private key and the public key associated with the signed public certificate. In some embodiments, the session manager 212 may initiate establishing of the digital identity 114 in response to a request to connect with the ground-based server 106. The request may be received by the session manager 212 from an operator of the aircraft 102 via an input/output device, one of the avionics hardware units 210, another line-replaceable unit, or the ground-based server 106, among others.

To initiate or establish the digital identity 114, the session manager 212 may generate a request for a public certificate (also referred to as a certificate signing request (CSR)) to transmit to the ground-based server 106. In generating the request for the public certificate, the session manager 212 may generate a private key 236 and a public key 238 for encrypting and decrypting messages exchanged between the LRU 104 and the ground-based server 106 in accordance with the communication protocol for the digital identity 114. In some embodiments, the session manager 212 may maintain or store an established digital identity 114 (e.g., including the public certificate, the private key 236 and/or the public key 238) in the memory 204. In some embodiments, the session manager 212 may use a pseudo-random number generator with a seed key value to generate the private key 236 and the public key 238. In some embodiments, the session manager 212 may use any asymmetric key generation algorithm (e.g., Diffie-Hellman key exchange, Rivest-Sharmir-Adleman (RSA) algorithm, and elliptic curve algorithm) to generate the private key 236 and the public key 238. The session manager 212 may include the public key 238 into the request for the public certificate.

In addition, the session manager 212 may generate or identify an identifier for the LRU 104 to include into the request for the public certificate. The identifier for the LRU 104 may include any set of alphanumeric characters. In some embodiments, the identifier for the LRU 104 may include a distinguished name (DN) (e.g., a fully qualified domain name (FQDN), email address, certificate serial number, user identifier, common name, domain name, organization name, physical address, host name, Internet Protocol (IP) address) in accordance to a certificate standard (e.g., X.509). The session manager 212 may include the identifier for the LRU 104 into the request for the public certificate. In some embodiments, the session manager 212 may store or maintain the identifier for the LRU 104 in memory 204 (e.g., as part of the digital identity 114).

In generating the request for the public certificate, the session manager 212 may also generate a digital signature. The digital signature may uniquely associate or assign the request for the public certificate with the LRU 104, and may be a numerical value or a set of alphanumeric characters. In some embodiments, the session manager 212 may use a cryptographic hash function to generate the digital signature (e.g., MD2, MD5, Secure Hash Algorithm (SHA)). In some embodiments, the session manager 212 may include the digital signature into the request for the public certificate. The request for the public certificate may include the public key 238, the identifier for the LRU 104, and the digital signature. With the generation of the public key 238, the identifier for the LRU 104, and the digital signature, the session manager 212 may transmit the request for the public certificate to the ground-based server 106 or the certificate authority 108 via the transceiver 208. In some embodiments, the session manager 212 may also store the request for the public certificate onto the memory 204 at the LRU 104.

The ground-based server 106 may receive the request for the public certificate from the LRU 104 for establishing the digital identity 114. At the ground-based server 106, the session manager 224 may parse the request for the public certificate to identify the public key 238 generated by the LRU 104. The session manager 224 may also store a copy of the public key 238 on the memory 222. In some embodiments, the session manger 224 may identify the certificate authority 108 for processing the request for the public certificate from the LRU 104. In some embodiments, there may be multiple certificate authorities, with each certificate authority corresponding to a separate domain for sessions, digital identities with the LRU 104 and/or the ground-based server 106. Once identified, the session manager 224 of the ground-based server 106 may forward or send the request for the public certificate to the certificate authority 108.

In some embodiments, prior to forwarding the request for the public certificate, the session manager 224 may determine whether the certificate authority 108 is available. In some embodiments, the session manager 224 may send a query for availability to the certificate authority 108. The session manager 224 may wait for a response from the certificate authority 108 for a predetermined amount of time. If there is a response within the predetermined amount of time indicating that the certificate authority 108 is available, the session manager 224 may forward the request for the public certificate to the certificate authority 108. On the other hand, if there is no response from the certificate authority 108 within the predetermined amount of time or if there is a response indicating that the certificate authority 108 is unavailable, the session manager 224 may determine that the certificate authority 108 is unavailable. The session manager 224 may then send a response to the LRU 104 indicating that that the certificate authority 108 is unavailable. The session manager 212 of the LRU 104 may wait for a predetermined amount of time. After the predetermined amount of time has elapsed, the session manager 212 may resend the request for the public certificate to the ground-based server 106, and the process of determining whether the certificate authority 108 may be repeated.

The certificate generator 232 of the certificate authority 108 may parse the request for the public certificate to identify the public key 238, the identifier for the LRU 104, and the digital signature generated by the LRU 104. The certificate generator 232 may validate the request for the public certificate to determine whether the request is in compliance with the communication protocol for the digital identity 114. When the request for the public certificate is determined to be valid, the certificate generator 232 may generate a public certificate 240 (also referred to as a public key certificate, digital certificate, or identity certificate, etc.) using the request. In generating the public certificate 240, the certificate generator 232 may generate a digital signature to include in the public certificate 240. The digital signature may uniquely associate or assign the public certificate 240 with the certificate authority 108, and may be a numerical value or a set of alphanumeric characters. In some embodiments, the certificate generator 232 may use a cryptographic hash function to generate the digital signature (e.g., MD2, MD5, and Secure Hash Algorithm (SHA)). In some embodiments, the certificate generator 232 may include the public key 238, the identifier for the LRU 104, and the digital signature generated by the LRU 104 from the received request into the public certificate 240.

The certificate generator 232 may include an identifier for the certificate authority 108 (e.g., a common name, organization, and fully quailed domain name (FQDN)) into the public certificate 240. The certificate generator 232 may also set an expiration time for the public certificate 240, and include the expiration time in the public certificate 240. The expiration time may include a date and a time, among others. In some embodiments, the certificate generator 232 may maintain the certificate revocation list 234. The certificate revocation list 234 may specify one or more public certificate 240 that are revoked or invalid prior to the elapsing of the expiration time. In some embodiments, the certificate authority 108 may correspond to a root certificate authority or an intermediary certificate authority. As the root certificate authority or the intermediary certificate authority, the certificate generator 232 may add the digital signature to the public certificate 240 that may have one or more other digital signatures from other certificate authorities. At each certificate authority, an identifier for the certificate authority may be added to the public certificate 240. The certificate generator 232 may send or transmit the public certificate 240 to the ground-based server 106.

The enrollment engine 226 of the ground-based server 106 may receive the public certificate 240 from the certificate authority 108. The enrollment engine 226 may store the public certificate 240 onto the memory 222 at the ground-based server 106. In some embodiments, the enrollment engine 226 may index the public certificate 240 by the identifier associated with the LRU 104. In some embodiments, the enrollment engine 226 may delete or remove the public certificate 240 from the memory 222 upon elapsing of the set expiration time for the public certificate 220. The enrollment engine 226 may forward or transmit the public certificate 240 to the LRU 104.

At the LRU 104 of the aircraft 102, the certificate validator 214 may receive the public certificate 240 via the transceiver 208 from the ground-based server 106. The certificate validator 214 may validate the public certificate 240 received from the ground-based server 106. In some embodiments, the certificate validator 214 may store the public certificate 240 onto the memory 204. In some embodiments, the session manager 212 may store or maintain the digital identity 114 (e.g., including the public certificate, the private key and/or public certificate 240) in memory 204. To validate the public certificate 240, in some embodiments, the certificate validator 214 may determine whether the public certificate 240 is valid via the certificate revocation list 234 maintained by the certificate authority 108. In some embodiments, the certificate validator 214 may send a query with the public certificate 240 to an online certificate status protocol (OCSP) server. The certificate validator 214 may receive a response from the OCSP server indicating whether the public certificate 240 is valid. Based on the response from the OCSP server to the query, the certificate validator 214 may determine whether the public certificate 240 is valid.

In some embodiments, the certificate validator 214 may determine whether the public certificate 240 is signed by a trusted certificate authority. The certificate validator 214 may parse the public certificate 240 to identify the identifier for the certificate authority 108. The certificate validator 214 may whether the identifier for the certificate authority 108 from the public certificate 240 corresponds to one of a list of trusted certificate authorities. If the identifier for the certificate authority 108 matches one on the list of trusted certificate authorities, the certificate validator 214 may determine that the public certificate 240 is signed by a trusted certificate authority and that the public certificate 240 is valid. Otherwise, if the identifier for the certificate authority 108 does not match any on the list of trusted certificate authorities, the certificate validator 214 may determine that the public certificate 240 is not signed by a trusted certificate authority and that the public certificate 240 is invalid.

In some embodiments, the certificate validator 214 may determine whether the public certificate 240 is valid against a defined trusted certification chain (also referred to as a chain of trust or a certificate chain) on the LRU 204. The certificate validator 214 may maintain the defined trusted certification chain on the memory 204. The defined trusted certification chain may specify a root certificate authority and one or more intermediary certificate authorities in sequence for validation of the public certificate 240. The certificate validator 214 may parse the public certificate 240 to identify a sequence of identifiers for the certificate authorities that signed the public certificate 240. The certificate validator 214 may compare the sequence of identifiers with the defined trusted certification chain. If the sequence matches the chain, the certificate validator 214 may determine that the public certificate 240 is valid. On the other hand, if the sequence does not match the chain, the certificate validator 214 may determine that the public certificate 240 is invalid.

In some embodiments, the certificate validator 214 may determine whether the public certificate 240 is successfully stored by the LRU 104 in the aircraft 102. In some embodiments, the certificate validator 214 may identify available memory or disk space at the LRU 104 (e.g., the memory 204). In some embodiments, the certificate validator 214 may compare the available memory or disk space to a size of a file corresponding to the public certificate 240. If the size of the file for the public certificate 240 is greater than the available memory or disk space, the certificate validator 214 may determine that the public certificate 240 is unsuccessfully stored on the memory 204. On the other hand, if the size of the file for the public certificate 240 is less than the available memory or disk space, the certificate validator 214 may initiate storing of the public certificate 240 onto the memory 220. The certificate validator 214 may monitor a progress of the storage onto the memory 220. The certificate validator 214 may determine that the public certificate 240 is successfully stored on the LRU 104. If after a number of predetermined attempts the public certificate 240 is unable to be stored on the memory 220, the certificate validator 214 may determine that the public certificate 240 is unable to be stored at the LRU 104 or verify the public certificate 240.

In some embodiments, the certificate validator 214 may determine whether the public certificate 240 has expired. The certificate validator 214 may parse the public certificate 240 to identify the pre-set expiration time. In some embodiments, the certificate validator 214 may maintain a timer to keep track of a current time. To determine whether the public certificate 240 is expired, the certificate validator 214 may compare the expiration time specified in the public certificate 240 with the current time indicated by the timer. If the expiration time is at a later time than the current time, the certificate validator 214 may determine that the public certificate 240 is not expired and that the public certificate 240 is valid. On the other hand, if the expiration time is at a previous time than the current time, the certificate validator 214 may determine that the public certificate 240 is expired and that the public certificate 240 is invalid.

In some embodiments, the certificate validator 214 may determine whether the public certificate 240 matches the request for the public certificate sent by the session manager 212 to the ground-based server 106. The certificate validator 214 may parse the public certificate 240 to identify the public key 238, the identifier for the LRU 104, and the digital signature generated by the session manager 212. As discussed above, the request for the public certificate may have been stored on the memory 204 at the LRU 104. The certificate validator 214 may access the memory 204 to retrieve the request for the public certificate. Once retrieved, the certificate validator 214 may parse the request for the public certificate to identify the public key 238, the identifier for the LRU 104, and the digital signature generated by the session manager 212. The certificate validator 214 may compare the public key 238 of the request with the public key 238 of the public certificate 240. The certificate validator 214 may also compare the identifier for the LRU 104 from the request with the identified for the LRU 104 from the public certificate 240. The certificate validator 214 may further compare the digital signature generated by the session manager 212 from the request with the digital signature for the LRU 104 included in the public certificate 240. If all match, the certificate validator 214 may determine that the public certificate 240 is valid. If any do not match, the certificate validator 214 may determine that the public certificate 240 is invalid.

In some embodiments, the certificate validator 214 may determine whether the private key 236 corresponding to the public certificate 240 is damaged or lost. The private key 236 may have become corrupt, damaged, or lost. The certificate validator 214 may access the memory 204 to identify the private key 236. If the memory 204 is determined not to include the private key 236, the certificate validator 214 may determine that the private key 236 is lost and that the public certificate 240 is invalid. On the other hand, if the memory 204 is determined to include the private key 236, the certificate validator 214 may determine whether the private key 236 is damaged. In some embodiments, the certificate validator 214 may determine whether the private key 236 is fully formed (e.g., of a predetermined length). If the private key 236 is determined to be not fully formed, the certificate validator 214 may determine that the private key 236 is damaged and that the public certificate 240 is invalid. On the other hand, if the private key 236 is determined to be fully formed, the certificate validator 214 may determine that the private key 236 is not damaged and that the public certificate 240 is valid.

In some embodiments, the certificate validator 214 may determine whether the public certificate 240 is damaged or lost. To determine whether the public certificate 240 is damaged or lost, the certificate validator 214 may determine whether the public certificate 240 contains a set of expected fields. The certificate validator 214 may parse the public certificate 240 to identify the public key 238, the identifier for the LRU 104, the digital signature generated by the session manager 212, the identifier for the certificate authority 108, and the digital signature generated by the certificate authority 108, among others. By parsing the public certificate 240, the certificate validator 214 may determine whether any of the set of fields (e.g., the public key 238, the identifier for the LRU 104, the digital signature generated by the session manager 212, the identifier for the certificate authority 108, and the digital signature generated by the certificate authority 108) is missing. If any of the set of fields is missing, the certificate validator 214 may determine that the public certificate 240 is damaged and that the public certificate 240 is invalid. In contrast, if all the fields are included, the certificate validator 214 may determine that the public certificate 240 is not damaged and that the public certificate 240 is valid.

According to a result of the validation of the public certificate 240, the certificate validator 214 may select a status code from a set of status codes. The status code may indicate whether the public certificate 240 is valid or invalid. The status code may also indicate whether the validation of the public certificate 240 is successful or is unsuccessful. Each status code may specify a corresponding action to be performed by the ground-based server 106. For example, the set of status codes together with the corresponding action may be:

| Status Code | Indication |
| --- | --- |
| 0 | Enrollment successful |
| 1 | Validation failure: the received public certificate 240 does not match the request for the public certificate or the private key 236 |
| 2 | Validation failure: the public certificate 240 was not signed by a trusted certificate authority |
| 3 | Storage failure: unable to store the received public certificate 240 |
| 4 | Validation failure: the public certificate 240 has already expired |

If the public certificate 240 is valid or the validation of the public certificate 240 is successful, the certificate validator 214 may select a status code indicating that the public certificate 240 is valid or the validation of the public certificate 240 is successful. In some embodiments, the certificate validator 214 may determine that the establishment of the digital identity 114 is complete, responsive to the determination that the public certificate 240 is valid or that the validation is successful. In some embodiments, the status code may also indicate to the ground-based server 106 that the digital identity 114 and/or the secure communication session 110 with the LRU 104 have been established. In some embodiments, the status code may also specify the ground-based server 106 to delete the local copy of the public certificate 240 from the memory 222. In some embodiments, the status code may specify the ground-based server 106 to initiate sending of messages via the secure communication session 110.

Conversely, if the public certificate 240 is invalid or the validation of the public certificate 240 is unsuccessful, the certificate validator 214 may select a status code indicating that the public certificate 240 is invalid or the validation of the public certificate 240 is unsuccessful. In some embodiments, the status code may indicate that the public certificate 240 does not match the request for the public certificate or the private key 236. In some embodiments, the status code may indicate that the public certificate 240 was not signed by a trusted certificate authority. In some embodiments, the status code may indicate that the public certificate 240 is unable to be stored at the LRU 104 or to be verified after a number of failed attempts. In some embodiments, the status code may indicate that the public certificate 240 has already expired. In some embodiments, the status code may specify that the ground-based server 106 is to retransmit the public certificate 240 to the LRU 104. In some embodiments, the status code may specify that the ground-based server 106 is to delete any previous requests for public certificates and associated certificates in preparation for a new request for public certificate. In this manner, establishment of the digital certificate 114 may be ensured.

With the selected status code, the certificate validator 214 may generate an enrollment status message to transmit to the ground-based server 106 via the transceiver 208. The enrollment status message may include the status code selected from the set of status codes indicating whether the public certificate 240 is valid and whether the validation of the public certificate 240 is successful and specifying which action the ground-based server 106 is to perform. In some embodiments, the enrollment status message may include the identifier for the LRU 104. If the validation is successful, the secure communication session 110 between the LRU 104 and the ground-based server 106 may have been established prior to generation or transmission of the enrollment status message. In some embodiments, the certificate validator 214 may encrypt the enrollment status message in accordance with the communication protocol for the secure communication session 110. The certificate validator 214 may then transmit the enrollment status message to the ground-based server 106.

The enrollment engine 226 may wait for receipt of the enrollment status message from the LRU 104. The enrollment engine 226 may process the enrollment status message received from the LRU 104. The enrollment engine 226 may parse the enrollment status message to identify the status code and/or the identifier for the LRU 104. The enrollment manager 224 may perform an action specified by the status code of the enrollment status message received from the LRU 104. Based on the status code of the enrollment status message, the enrollment manager 224 may also determine whether the public certificate 240 is valid or whether the validation of the public certificate 240 by the LRU 104 is successful.

If the status code indicates that the public certificate 240 is valid or the validation is successful, the enrollment engine 226 may determine the public certificate 240 is valid or the validation is successful. Further, the enrollment engine 226 may delete a locally stored copy of the public certificate 240 from the memory 222 in response to the determination. In some embodiments, the enrollment engine 226 may permit the reporting engine 228 to initiate transmission of data via the secure communication session 110, upon determining that the public certificate 240 is valid or the validation is successful. Additional details regarding the functionalities of the reporting engine 228 are discussed herein below.

On the other hand, if the status code indicates that the public certificate 240 is invalid or the validation is unsuccessful, the enrollment engine 226 may identify a cause of failure in the invalidity of the public certificate 240 or the validation of the public certificate 240 based on the status code. As discussed above, the status code of the enrollment status message may indicate the cause of failure in the invalidity of the public certificate 240 or the validation of the public certificate 240. In some embodiments, the memory 222 of the ground-based server 106 may include a list of causes of failures with the corresponding status code and measure or action to be performed. Using the list, the enrollment engine 226 may identify the action to be performed for the identified cause of failure. The action may include: re-sending the request for the public certificate generated by the LRU 104 to the certificate authority 108 to re-generate the public certificate 240, identifying the proper certificate authority or authorities to sign the public certificate 240, resending the public certificate 240 from the certificate authority 108 to the LRU 104, send a command to re-enroll to the LRU 104, or any combination thereof.

In some embodiments, based on the status code, the enrollment engine 226 may identify the public certificate 240 revoked by the OCSP server or the certificate revocation list 234 as the cause of failure. Based on the identified cause of failure, the enrollment engine 226 may forward the request for the public certificate generated by the LRU 104 to the certificate authority 108 to regenerate the public certificate 240. In some embodiments, based on the status code, the enrollment engine 226 may identify the public certificate 240 not being signed by a trusted certificate authority as the cause of failure. Based on the identified cause of failure, the enrollment engine 226 may re-identify the proper certificate authority 108. The enrollment engine 226 may forward the request for the public certificate generated by the LRU 104 to the certificate authority 108 to regenerate the public certificate 240. In some embodiments, based on the status code, the enrollment engine 226 may identify non-compliance with the defined trusted certification chain as the cause of failure. Based on the identified cause of failure, the enrollment engine 226 may then identify the one or more proper certificate authorities (e.g., the certificate authority 108) to sign the public certificate 240. The enrollment engine 226 may also forward the request for the public certificate generated by the LRU 104 to the certificate authority 108 to regenerate the public certificate 240.

In some embodiments, based on the status code, the enrollment engine 226 may identify inability to store the public certificate 240 after the predetermined number of attempts on the LRU 104 as the cause of failure. Based on the identified cause of failure, the enrollment engine 226 may resend the public certificate 240 from the certificate authority 108 to the LRU 104. In some embodiments, based on the status code, the enrollment engine 226 may identify expiration of the public certificate 240 as the cause of failure. Based on the identified cause of failure, the enrollment engine 226 may forward the request for the public certificate generated by the LRU 104 to the certificate authority 108 to regenerate the public certificate 240. In some embodiments, based on the status code, the enrollment engine 226 may identify the request for the public certificate not matching the public certificate 240 as the cause of failure. Based on the identified cause of failure, the enrollment engine 226 may forward the request for the public certificate generated by the LRU 104 to the certificate authority 108 to regenerate the public certificate 240. In some embodiments, based on the status code, the enrollment engine 226 may identify the private key 236 corresponding to the public certificate 240 as damaged or lost. In some embodiments, based on the status code, the enrollment engine 226 may identify damage or loss of the public certificate 240 as the cause of failure. Based on the identified cause of failure, the enrollment engine 226 may re-send the public certificate 240 generated by the certificate authority 108 to the LRU 104.

The enrollment engine 226 may also maintain the list of identities 230 on the memory 222 of the ground-based server 106. The list of identities 230 may indicate which line-replaceable units (e.g., the LRU 104) have current digital identities (e.g., the digital identity 114). When the status code of the enrollment status message from the LRU 104 indicates that the public certificate 240 is valid or that the validation is successful, the enrollment engine 226 may add the identifier for the LRU 104 onto the list of identities 230. In some embodiments, the enrollment engine 226 may include or insert a status of the identifier for the LRU 104. The status may be initially valid. In some embodiments, the enrollment engine 226 may maintain a time to keep track of an amount of time that the digital identity 114 (e.g., public certificate of the digital identity 114) is valid for the LRU 104. The amount of time may also be added onto the list of identities 230.

The certificate validator 214 may re-validate the public certificate 240, using the techniques for the validation of the public certificate 240 detailed above. The re-validation of the public certificate 240 may be performed in accordance to a schedule. The schedule may specify a set of times to perform re-validation of the public certificate 240. In some embodiments, the schedule may be for a predetermined amount of time subsequent to the transmission of the enrollment status message or establishment of the secure communication session 110. According to a result of the re-validation of the public certificate 240, the certificate validator 214 may select a status code from a set of status codes. The set of status codes may be the same as the set of status codes for the enrollment status message detailed above. The status code may also indicate whether the re-validation of the public certificate 240 is successful or is unsuccessful. Each status code may specify a corresponding action to be performed by the ground-based server 106.

If the re-validation of the public certificate 240 is successful, the certificate validator 214 may select a status code indicating that the re-validation of the public certificate 240 is successful. Conversely, if the re-validation of the public certificate 240 is unsuccessful, the certificate validator 214 may select a status code indicating that the re-validation of the public certificate 240 is unsuccessful. In some embodiments, the status code may indicate that the public certificate 240 does not match the request for the public certificate or the private key 236. In some embodiments, the status code may indicate that the public certificate 240 was not signed by a trusted certificate authority. In some embodiments, the status code may indicate that the public certificate 240 is unable to be stored at the LRU 104 or to be verified after a number of failed attempts. In some embodiments, the status code may indicate that the public certificate 240 has expired. In some embodiments, the status code may specify that the ground-based server 106 is to retransmit the public certificate 240 to the LRU 104. In some embodiments, the status code may specify that the ground-based server 106 is to delete any previous requests for public certificates and associated certificates in preparation for a new request for public certificate.

Having selected the status code, the certificate validator 214 may generate a certificate status message to transmit to the ground-based server 106 via the transceiver 208. The certificate status message may include the status code selected from the set of status codes indicating whether the re-validation of the public certificate 240 is successful and specifying which action the ground-based server 106 is to perform. In some embodiments, the certificate status message may include the identifier for the LRU 104. In some embodiments, the certificate validator 214 may identify usage statistics of the public certificate 240. In some embodiments, the usage statistics may include a data transmission rate via the secure communication session 110 by the LRU 104 to the ground-based server 106. In some embodiments, the usage statistics may include a frequency of application of the private key 236 or the public key 238 (e.g., for establishing a tunnel for authentication, or for signing data to ensure integrity of the data). The private key for instance, may be used to sign data, but is not typically used to sign every message in a VPN tunnel. Once identified, the certificate validator 214 may include the usage statistics into the certificate status message. In some embodiments, the certificate validator 214 may encrypt the certificate status message in accordance with the communication protocol for the secure communication session 110. The certificate validator 214 may then transmit the certificate status message to the ground-based server 106. The certificate validator 214 may continue to generate and transmit the certificate status message until next re-validation of the public certificate 240 (e.g., as specified by the schedule) or upon receipt of the response from the ground-based server 106.

With the establishment of the digital identity 114, the enrollment engine 226 of the ground-based server 106 may wait for the certificate status message from the LRU 104. The enrollment engine 226 may maintain a timer to keep track of an amount of time elapsed since the establishment of the digital identity 114 or the receipt of the enrollment status message. The enrollment engine 226 may compare the amount of elapsed time to a predetermined amount of time for waiting for the certificate status message. In some embodiments, the predetermined amount of time may be set based on the schedule of the LRU 104 for the re-validation of the public certificate 240.

If the certificate status message is not received within the predetermined amount of time, the enrollment engine 226 may determine that the re-validation of the public certificate 240 by the LRU 104 is unsuccessful. On the other hand, if the certificate status message is received within the predetermined amount of time, the enrollment engine 226 may parse the certificate status message to identify the status code. Using the status code of the certificate status message, the enrollment engine 226 may determine whether the re-validation of the public certificate 240 by the LRU 104 is successful. If the status code indicates the re-validation is successful, the enrollment engine 226 may determine that the re-validation of the public certificate 240 by the LRU 104 is successful. The ground-based server 106 may continue to exchange messages via the secure communication session 110 with the LRU 104. In some embodiments, the enrollment engine 226 may parse the certificate status message to identify the usage statistics of the public certificate 240. The enrollment engine 226 may store the usage statistics of the public certificates 240 with the identifier for the LRU 104 onto the list of identities 230. The enrollment engine 226 may also transmit an acknowledgement response to the LRU 104 to confirm receipt of the certificate status message.

If the status code indicates the re-validation is unsuccessful, the enrollment engine 226 may determine that the re-validation of the public certificate 240 by the LRU 104 is unsuccessful. With the determination that the re-validation of the public certificate 240 is unsuccessful, the enrollment engine 226 may perform the action indicated by the status code of the certificate status message. The action performed may be the same as the actions detailed above in connection with the enrollment status message, such as the re-sending the request for the public certificate generated by the LRU 104 to the certificate authority 108 to re-generate the public certificate 240, identifying the proper certificate authority or authorities to sign the public certificate 240, resending the public certificate 240 from the certificate authority 108 to the LRU 104, send a command to re-enroll to the LRU 104, or any combination thereof, among others.

In addition, the enrollment engine 226 may determine that the LRU 104 is to re-enroll, in response to the determination that the re-validation of the public certificate 240 is unsuccessful. In some embodiments, the enrollment engine 226 may determine that the LRU 104 is to re-enroll, when the time duration of the digital identity 114 exceeds its validity period. In some embodiments, the enrollment engine 226 may insert a revocation indicator with the identifier for the LRU 104 in the list of identities 230. The revocation indicator may specify that the LRU 104 is to re-enroll with the ground-based server 106. In some embodiments, the revocation indicator may indicate that the re-validation of the public certificate 240 is unsuccessful at the LRU 104 corresponding to the identifier. In some embodiments, the enrollment engine 226 may set or update a status of the identifier for the LRU 104 in the list of identifiers 230 from valid to revoked. In some embodiments, the enrollment engine 226 may remove or delete the identifier for the LRU 104 from the list of identities 230 based on determining that the re-validation is unsuccessful.

The certificate validator 214 may also generate a check-in message to send to the ground-based server 106 to verify that the identifier for the LRU 104 is on the list of identities 230. In some embodiments, the certificate validator 214 may generate the check-in message subsequent to the transmission of the certificate status message. The check-in message may also specify the ground-based server 106 to perform an identity status check for the LRU 104. The check-in message may include the identifier for the LRU 104. In some embodiments, the check-in message may also include public certificate 240. The certificate validator 214 may generate the check-in message using the identifier for the LRU 104. The certificate validator 214 may transmit the check-in message to the ground-based server 106.

The enrollment engine 226 may receive the check-in message from the LRU 104. Using the check-in message, the enrollment engine 226 may perform the identity status check for the LRU 104. With receipt of the check-in message, the enrollment engine 226 may parse the check-in message to identify the identifier for the LRU 104. To perform the identity status check, the enrollment engine 226 may access the list of identifiers 230 to identify the status of the identifier for the LRU 104 using the identifier for the LRU 104. In accordance with the status of the identity status check, the enrollment engine 226 may generate a status response. Based on the status of the identifier of the LRU 104 in the list of identifiers 230, the enrollment engine 226 may generate the status response. If the status indicates that the identifier for the LRU 104 is valid, the enrollment engine 226 may generate the status response to indicate that the identifier for the LRU 104. In addition, messages may continue to be exchanged via the secure communication session 110 between the LRU 104 and the ground-based server 106. On the other hand, if the status indicates that the identifier for the LRU 104 is revoked or deleted from the list of identifiers, the enrollment engine 226 may generate the status response indicating that that the identifier for the LRU 104 is invalid or revoked. The enrollment engine 226 may also terminate the secure communication session 110 in accordance with the communication protocol. In some embodiments, the status response may also include a trigger specifying that the LRU 104 is to re-enroll with the ground-based server 106. In some embodiments, the enrollment engine 226 may include the identifier for the LRU 104 into the status response. Once generated, the enrollment engine 226 may transmit the status response to the LRU 104.

The certificate validator 214 may receive the status response from the ground-based server 106. The certificate validator 214 may parse the status response to determine whether the LRU 104 is to re-enroll with the ground-based server 106. If the status response indicates that the identifier for the LRU 104 is valid, the certificate validator 214 may determine that the LRU 104 in not to re-enroll with the ground-based server 106. Further, the digital identity 114 and/or the secure communication session 110 may continue to be used to exchange messages between the LRU 104 and the ground-based server 106. On the other hand, if the status response indicates that the identifier for the LRU 104 is revoked, the certificate validator 214 may determine that the LRU 104 in to re-enroll with the ground-based server 106. The certificate validator 214 may also delete or remove the private key 236, the public key 238, or the public certificate 240 from the memory 204. In some embodiments, the certificate validator 214 may terminate the secure communication session 110. In response to the determination to re-enroll, the session manager 212 may re-initiate or re-establish the digital identity 114 with the ground-based server 106 (e.g., for signing data or communications), using the same functionalities as detailed above. In some embodiments, the session manager 212 may re-initiate a secure communication session 110 with the ground-based server 106, using the same functionalities as detailed above, in response to the determination to re-enroll.

While the secure communication session 110 is open, the data aggregator 216 of the LRU 104 may aggregate or receive information from the avionics hardware unit 210 of the aircraft 102. Each avionics hardware unit 210 may be located in an electronics/engineering (E/E) bay area or in a location in the cabin, bulkhead, bag bin region, or an avionics rack of the aircraft 102. Each avionics hardware unit 210 may include processors, memory, and sensors to measure various information regarding the aircraft 102, such as flight operations or maintenance data. The sensors may include a radar antenna, a fuel gauge, a compass, a gyroscope, an altimeter, a video, a camera (e.g., visual, infrared, or ultraviolet), a microphone, air pressure meter, thermometer, hydraulic pressure sensor, weight sensor, voltmeter, fire detector, air particle detector, barometer, turbine sensors, and instrument landing system, among others for instance. The communication interface 206 may receive the information from the avionic hardware units 210 via wireless or wire connection. Via the communication interface 206, the data aggregator 216 may aggregate the information from the avionics hardware units 210. The data aggregator 216 may generate one or more messages including the aggregated information from the avionics hardware units 210 to communicate the information to the ground-based server 106. The data aggregator 216 may send or transmit the one or more messages to the ground-based server 106.

The reporting engine 228 of the ground-based server 106 may provide services (e.g., reporting services) regarding the operation or status of the LRU 104, the digital identity 114, or the secure communication session 110. In some embodiments, the reporting engine 228 may be a combination of hardware and software to provide the services. In some embodiments, the reporting engine 228 may be a combination of hardware and software to interface with other customizable software executable on the ground-based server 106 to provide the services. In some embodiments, the reporting engine 228 may present information regarding the operation or status of the LRU 104 or the digital identity 114 or the secure communication session 110. In some embodiments, the reporting engine 228 may receive the information from the data aggregator 216 of the LRU 104. The reporting engine 228 may present (e.g., via a display or other input/output device) the information gathered by the data aggregator 216, such as the flight information and the maintenance data of the aircraft 102, upon request from a user or another computing device. In some embodiments, the reporting engine 228 may present information regarding the digital identity 114 or the secure communication session 110, such as the usage statistics of the public certificate 240, the enrollment status message including the status code, or the certificate status message including the status code, upon a request from a user or another computing device.

Figure 3A:
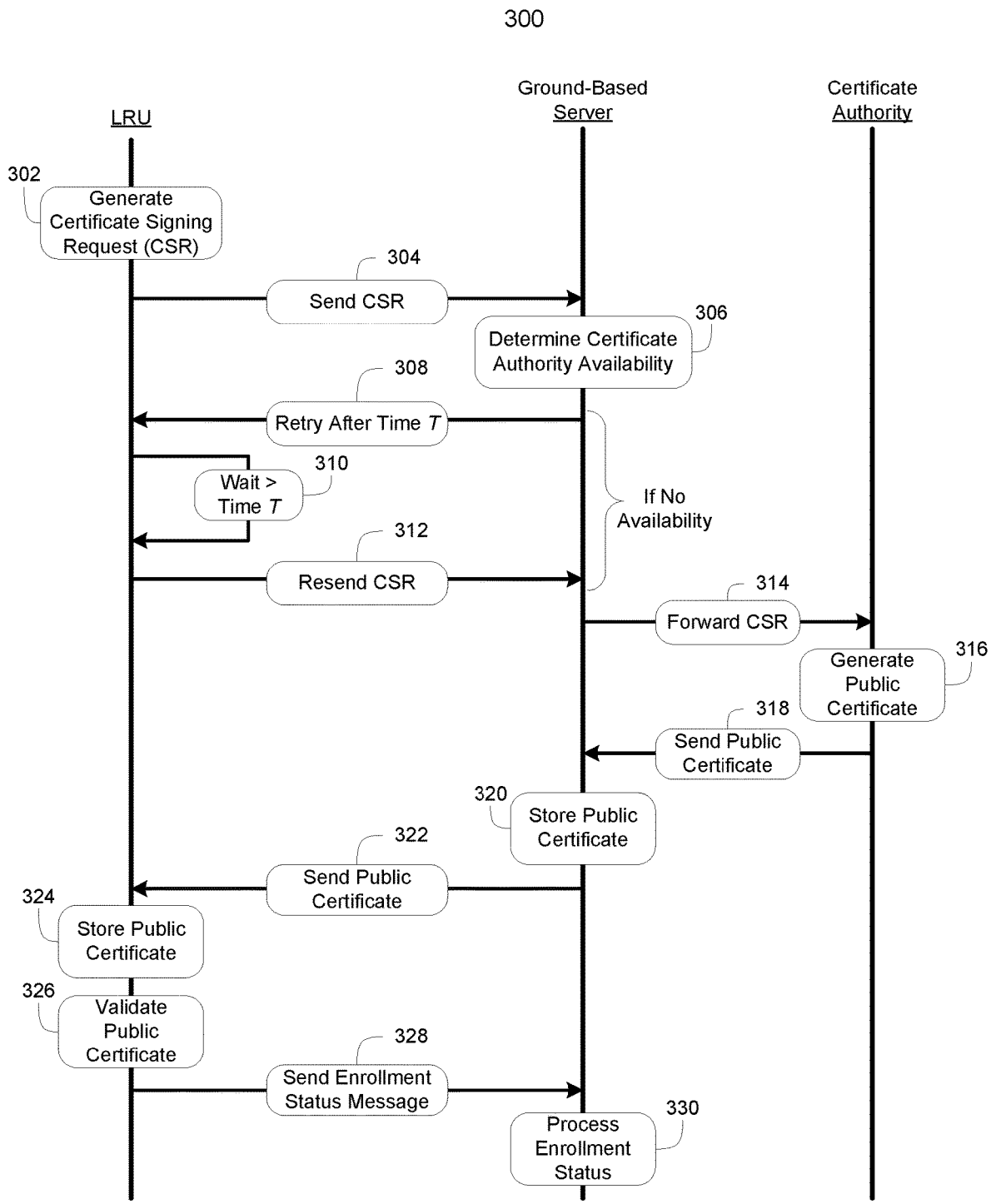
FIGS. 3A and 3B show a sequence diagram of a method of managing enrollment of digital identities, in accordance with some embodiments of the inventive concepts disclosed herein.
Figure 3B:
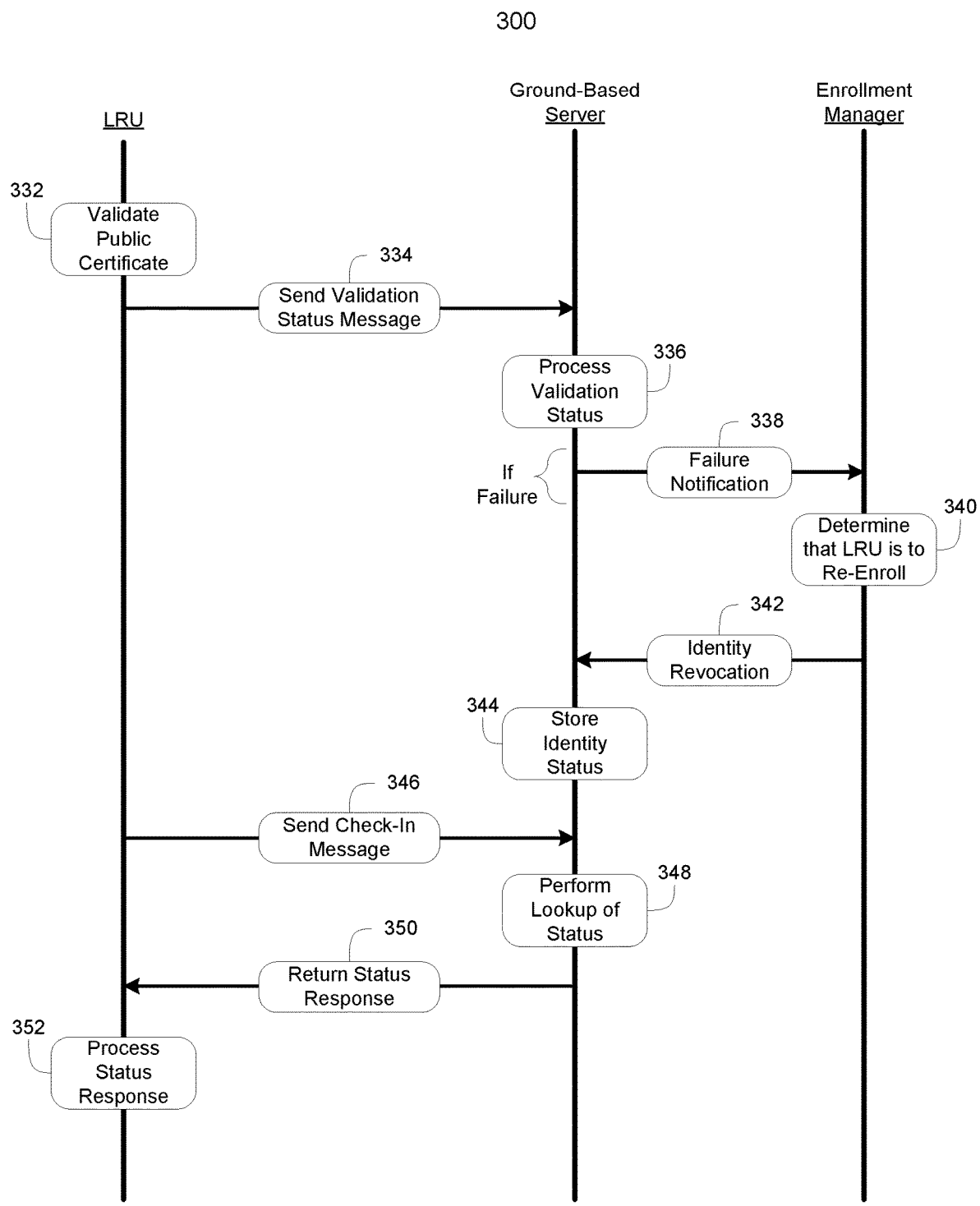

Referring to FIGS. 3A and 3B, illustrated is a sequence diagram for a method 300 of managing enrollment of digital identities for air-to-ground communication, in accordance with embodiments of the inventive concept disclosed herein. The steps, actions, and other related functionalities of the method 300 may be performed by the LRU 104 in the aircraft 102, the ground-based server 106, and the certificate authority 108 as detailed above in connection with FIGS. 1 and 2. A line-replaceable unit (LRU) may generate a certificate signing request (302). The LRU may send the certificate signing request to a ground-based server (304). The ground-based server may determine whether a certificate authority has availability (306). If there is no availability, the ground-based server may send a reply specifying that the line-replaceable unit is to resend the certificate signing request after a predetermined time T (308). The LRU may wait for the predetermined time T (310). Upon elapsing of the predetermined time, the LRU may re-send the certificate signing request to the ground-based server (312).

The ground-based server may forward the certificate signing request to the certificate authority (314). The certificate authority may generate a public certificate using the certificate signing request (316). The certificate authority may send the public certificate to the ground-based server (318). The ground-based server may store the public certificate (320). The ground-based server may send the public certificate to the line-replaceable unit (322). The LRU may store the public certificate (324). The LRU may validate the public certificate (326). Based on the validation of the public certificate, the LRU may send an enrollment status message to the ground-based server (328). The ground-based server may process the enrollment status message (330).

The LRU may re-validate the public certificate (332). The LRU may send the validation status message to the ground-based server (334). The ground-based server may process the validation status message (336). If the validation status message indicates failure in the re-validation of the public certificate, the ground-based server may send or relay a failure notification to an enrollment manager (338). The enrollment manager of the ground-based server may determine that the LRU is to re-enroll (340). Based on the determination, the enrollment manager may send an identity revocation to the ground-based server (342). The ground-based server may store the identity status for the LRU (344). The LRU may send a check-in message to the ground-based server (346). The ground-based server may perform a lookup of the status for the LRU (348). The ground-based server may return a status response to the LRU (350). The LRU may process the status response (352).

Figure 4A:
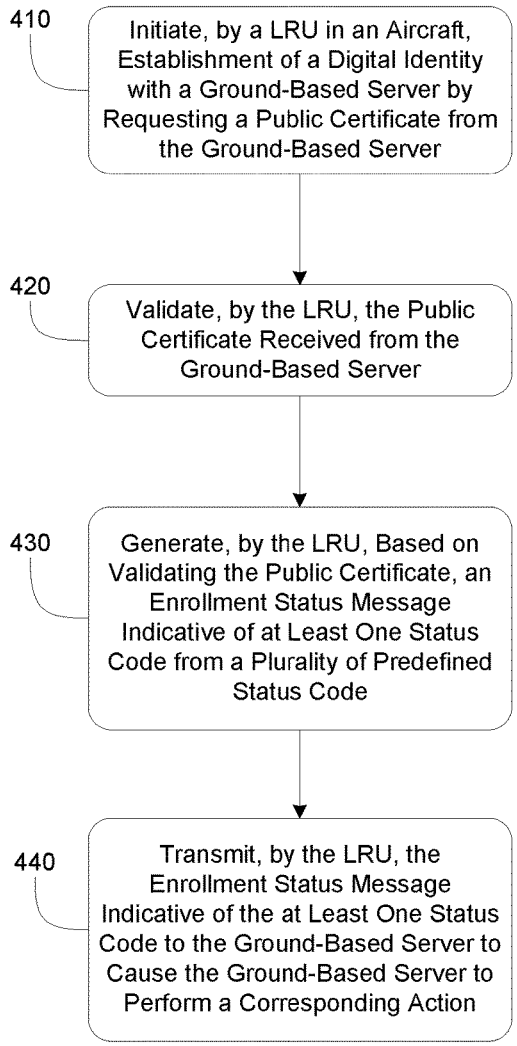
FIGS. 4A and 4B show flow diagrams of methods of managing enrollment of digital identities, in accordance with some embodiments of the inventive concepts disclosed herein.

Referring to FIG. 4A, illustrated is a flow diagram for an exemplary embodiment of a method 400 of managing enrollment of digital identities for air-to-ground communication, according to the inventive concepts disclosed herein. The steps, actions, and other related functionalities of the method 400 may be performed by the LRU 104 in the aircraft 102 as detailed above in connection with FIG. 1. In brief overview, a LRU in an aircraft may initiate establishment of a digital identity with a ground-based server by requesting a public certificate from the ground-based server (410). The LRU may validate the public certificate received from the ground-based server (420). The LRU may generate, based on validating the public certificate, an enrollment status message indicative of at least one status code from a plurality of predefined status codes (430). The LRU may transmit the enrollment status message indicative of the at least one code to the ground-based server to cause the ground-based server to perform a corresponding action (440).

In further detail, referring now to step 410, a LRU in an aircraft may establish a digital identity with a ground-based server by requesting a public certificate from the ground-based server. The digital identity may in accordance to any public key infrastructure (PKI) based communication protocol. To establish the digital identity, the LRU may generate a private key and a public key using an asymmetric key encryption algorithm. The LRU may generate a certificate signing request to transmit to the ground-based server. The certificate signing request may include the public key, an identifier for the LRU, and a digital signature uniquely associated with the LRU.

Referring now to step 420, the LRU may validate the public certificate received from the ground-based server (420). In establishing the digital identity, the LRU may receive the public certificate from the ground-based server. The public certificate may include the public key, the identifier for the LRU, and the digital signature included in the certificate signing request and a digital certificate generated by a certificate authority. To validate the public certificate, the LRU may check the content of the public certificate. In some embodiments, the LRU may compare the public key in the public certificate with the generated public key.

Referring now to step 430, the LRU may generate, based on validating the public certificate, an enrollment status message indicative of at least one status code from a plurality of predefined status codes. Based on the validation of the public certificate, the LRU may select the status code. The status code may indicate whether the public certificate is valid and whether the validation of the public certificate is successful. If the public certificate is invalid or the validation of the public certificate is unsuccessful, the status code may further identify a cause of the failure. The status code may indicate which action the ground-based server is to perform.

Referring now to step 440, the LRU may transmit the enrollment status message indicative of the at least one code to the ground-based server to cause the ground-based server to perform a corresponding action. Using the status code selected based on the validation of the public certificate, the LRU may generate the enrollment status message. The LRU may send the enrollment status message to the ground-based server.

Figure 4B:
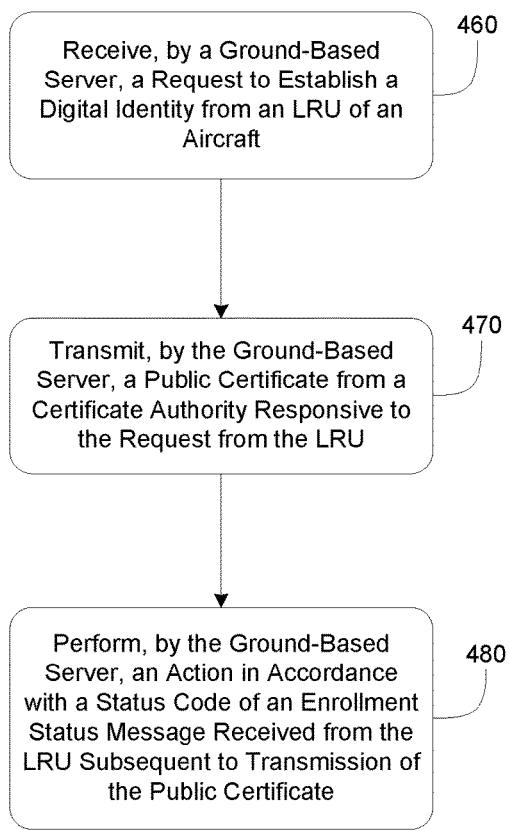

Referring to FIG. 4B, illustrated is a flow diagram for an exemplary embodiment of a method 450 of managing enrollment of digital identities in air-to-ground secure communication sessions, according to the inventive concepts disclosed herein. The steps, actions, and other related functionalities of the method 450 may be performed by the ground-based server 106 as detailed above in connection with FIG. 1. In brief overview, a ground-based server may receive a request to establish a digital identity from a line-replaceable unit (LRU) of an aircraft (460). The ground-based server may transmit a public certificate from a certificate authority responsive to the request from the LRU (470). The ground-based server may perform an action in accordance with a status code of an enrollment status message received from the LRU (480).

In further detail, referring now to step 460, a ground-based server may receive a request to establish a digital identity from a LRU of an aircraft. The digital identity may in accordance to any public key infrastructure (PKI) based communication protocol. The request to establish the digital identity may include a public key generated by the LRU, an identifier for the LRU, and a digital signature uniquely associated with the LRU.

Referring now to step 470, the ground-based server may transmit a public certificate from a certificate authority responsive to the request from the LRU. In response to the request to establish the digital identity, the ground-based server may forward the request to the certificate authority. The certificate authority may generate the public certificate to send to the ground-based server. The public certificate may include the request including the public key, the identifier for the LRU and the digital signature of the LRU, as well as a digital certificate uniquely assigned to the certificate authority. The ground-based server may send the public certificate received from the certificate authority to the LRU.

Referring now to step 480, the ground-based server may perform an action in accordance with a status code of an enrollment status message received from the LRU. With the receipt of the public certificate, the LRU may validate the public certificate. Based on a result of the validation, the LRU may select a status code from a set of predefined status codes. The status code may indicate whether the validation of the public certificate is successful and which action the ground-based server is to perform. The ground-based server may identify the status code from the enrollment status message. Using the status code, the ground-based server may determine whether the validation is successful. If the validation of the public certificate is unsuccessful, the ground-based server may determine or identify the cause of failure from the status code. The ground-based server may also perform the action as specified by the status code of the enrollment status message.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

The inventive concepts disclosed herein contemplate methods, systems and program products on any machine-readable media for accomplishing various operations. Embodiments of the inventive concepts disclosed herein may be implemented using existing computer operational flows, or by a special purpose computer operational flows for an appropriate system, incorporated for this or another purpose, or by a hardwired system. Embodiments within the scope of the inventive concepts disclosed herein include program products comprising machine-readable media for carrying or having machine-executable instructions or data structures stored thereon. Such machine-readable media can be any available media that can be accessed by a special purpose computer or other machine with an operational flow.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with an operational flow. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a special purpose computer, or special purpose operational flowing machines to perform a certain function or group of functions.

What is claimed is:

1. A method for managing certificates, comprising: initiating, by at least one processor of a line-replaceable unit (LRU) in an aircraft, establishment of a digital identity with a ground-based server by requesting a public certificate from the ground-based server via the at least one processor; receiving, by the LRU, the public certificate from the ground-based server; validating, by the LRU, the public certificate; generating, by the LRU, based on validating the public certificate, an enrolment status message indicative of at least one status code from a plurality of predefined status codes associated with a plurality of corresponding actions for the ground-based server; and transmitting, by the LRU, the enrollment status message indicative of the at least one status code to the ground-based server, to cause the ground-based server to perform a corresponding action based on the at least one status code.

2. The method of claim 1, further comprising:
    establishing, by the LRU, the digital identity with the ground-based server;
    re-validating, by the LRU, the public certificate subsequent to a time period after establishing the digital identity;
    generating, by the LRU, based on re-validating the public certificate, a certificate status message indicative of an updated status code comprising one of the at least one status code or a second status code from the plurality of predefined status codes; and
    transmitting, by the LRU, the certificate status message including the updated status code to the ground-based server, to cause the ground-based server to perform a second corresponding action based on the updated status code.

3. The method of claim 2, wherein transmitting the certificate status message comprises transmitting the certificate status message at intervals until one of a next re-validation of the public certificate occurs or upon receipt of a response from the ground-based server.

4. The method of claim 1, wherein generating the enrollment status message further comprises selecting the at least one status code indicating that the public certificate is valid or that the validation is successful, and
    wherein transmitting the enrollment status message further comprises transmitting the enrollment status message to cause the ground-based server to delete a copy of the public certificate.

5. The method of claim 1, wherein generating the enrollment status message further comprises selecting the at least one status code indicating that the public certificate is valid or that the validation is successful, and
    wherein transmitting the enrollment status message further comprises transmitting the enrollment status message to indicate to the ground-based server that the digital identity with the LRU has been established.

6. The method of claim 1, wherein generating the enrollment status message further comprises selecting the at least one status code indicating that the public certificate is invalid or that the validation is unsuccessful, and
    wherein transmitting the enrollment status message further comprises transmitting the enrollment status message to cause the ground-based server to delete any previous request and associated certificate in preparation for a new certificate request.

7. The method of claim 1, wherein generating the enrollment status message further comprises selecting the at least one status code indicating that the public certificate is unable to be stored after one or more failed attempts to receive or verify the public certificate, and
    wherein transmitting the enrollment status message further comprises transmitting the enrollment status message to cause the ground-based server to delete any previous request and associated certificate in preparation for a new certificate request.

8. The method of claim 1, wherein validating the public certificate comprises at least one of:
    determining whether the public certificate is valid via a certificate revocation list or an online certificate status protocol (OCSP) server;
    determining whether the public certificate is signed by a trusted certificate authority;
    determining whether the public certificate is valid against a defined trusted certification chain on the LRU;
    determining whether the public certificate is successfully stored by the LRU in the aircraft;
    determining whether the public certificate has expired;
    determining whether the public certificate matches a certificate signing request (CSR) sent by the LRU to request the public certificate from the ground-based server;
    determining whether the private key corresponding to the public certificate is damaged or lost; or
    determining whether the public certificate is damaged or lost.

9. A line-replaceable unit (LRU) in an aircraft, comprising:
    a memory including a session manager executable on at least one processor, configured to transmit a request for a public certificate to a ground-based server to establish a digital identity; and a certificate validator executable on the at least one processor, configured to: validate the public certificate from the ground-based server; and generate an enrollment status message including a status code to transmit to the ground-based server for performing an action based on the validation of the public certificate.

10. The line-replaceable unit of claim 9, wherein the certificate validator is further configured to:
    re-validate the public certificate subsequent to a time period after the transmission of the enrollment status message; and generate a certificate status message indicative of an updated status code to transmit to the ground-based server to perform a corresponding action based on the updated status code.

11. The line-replaceable unit of claim 9, wherein the certificate validator is further configured to:
generate a check-in message to transmit to the ground-based server based on the public certificate to cause the ground-based server to perform an identity status check using the check-in message; and
receive a status response indicating a result of the identity status check from the ground-based server.

12. The line-replaceable unit of claim 9, wherein the certificate validator is further configured to establish a secure communication with the ground-based server prior to transmission of the enrollment status message to the ground-based server.

13. The line-replaceable unit of claim 9, further comprising a communication interface to communicate information including flight operations or maintenance data of the aircraft to the ground-based server.

14. A ground-based server for communicating with airborne units, comprising:
a memory including a communication interface executable on at least one processor, configured to receive a request to establish a digital identity from a line-replaceable unit (LRU) of an aircraft; and an enrollment engine executable on the at least one processor, configured to: transmit a public certificate from a certificate authority responsive to the request from the LRU; and perform an action, the action performed in accordance with a status code indicated by an enrollment status message received from the LRU subsequent to the transmission of the public certificate, the status code indicating a result of a validation of the public certificate by the LRU.

15. The ground-based server of claim 14, wherein the enrollment engine is further configured to:
determine that a certificate status message is not received from the LRU within a predefined time period subsequent to the receipt of the enrollment status message; and
retransmit the public certificate to LRU, responsive to the determination that the certificate status message is not received.

16. The ground-based server of claim 14, wherein the enrollment engine is further configured to:

receive a check-in message generated based on the public certificate from the LRU;
perform an identity status check for the LRU using the check-in message; and
transmit a status response indicating a result of the identity status check to the LRU.

17. The ground-based server of claim 14, wherein the enrollment engine is further configured to:
determine, based on the status code of the enrollment status message, that the public certificate is valid or that the validation of the public certificate is successful; and
delete a locally stored copy of the public certificate, responsive to the determination that the public certificate is valid or that the validation of the public certificate is successful.

18. The ground-based server of claim 14, wherein the enrollment engine is further configured to:
determine, based on the status code of the enrollment status message, that the public certificate is invalid or that the validation of the public certificate is unsuccessful;
identify a cause of failure in the validation of the public certificate corresponding to the status code of the enrollment status message, responsive to the determination that the public certificate is invalid or that the validation of the public certificate is unsuccessful; and
perform the action in accordance to the identified cause of failure of the validation of the public certificate corresponding to the status code of the enrollment status message.

19. The ground-based server of claim 14, wherein the enrollment engine is further configured to:
receive, subsequent to a time period after establishing the digital identity, a certificate status message including an updated status code from the LRU, the updated status code comprising one of the status code or a second status code; and
perform a second action in accordance with the updated status code of the certificate status message received from the LRU.

20. The ground-based server of claim 14, further comprising a reporting engine configured to present at least one of the enrollment status message or the updated status code, to a requesting user or system.

* * * * *